United States Patent
Coffignal et al.

(10) Patent No.: US 8,655,479 B2
(45) Date of Patent: Feb. 18, 2014

(54) METHOD OF DETERMINING THE CONDITIONS OF A PHASE FOR MACHINING A WORKPIECE WITH MODULATED CUTTING RATE

(75) Inventors: Gerard Maurice Henri Coffignal, Maison Alfort (FR); Philippe Lorong, Antony (FR); Alexis Perez-Duarte, Bourg la Reine (FR)

(73) Assignee: SNECMA, Paris (FR)

( * ) Notice: Subject to any disclaimer, the term of this patent is extended or adjusted under 35 U.S.C. 154(b) by 392 days.

(21) Appl. No.: 13/055,784

(22) PCT Filed: Jul. 24, 2009

(86) PCT No.: PCT/FR2009/051492
§ 371 (c)(1),
(2), (4) Date: Jan. 25, 2011

(87) PCT Pub. No.: WO2010/010310
PCT Pub. Date: Jan. 28, 2010

(65) Prior Publication Data
US 2011/0118865 A1    May 19, 2011

(30) Foreign Application Priority Data
Jul. 25, 2008   (FR) ...................................... 08 55123

(51) Int. Cl.
*G05B 19/406*          (2006.01)
(52) U.S. Cl.
USPC ............. 700/175; 700/188; 700/96; 700/173; 82/1.11

(58) Field of Classification Search
USPC ...................... 700/175, 188, 96, 173; 82/1.11
See application file for complete search history.

(56) References Cited

U.S. PATENT DOCUMENTS

| | | | |
|---|---|---|---|
| 6,266,572 | B1 | 7/2001 | Yamazaki et al. |
| 6,662,073 | B1 | 12/2003 | Fujishima et al. |
| 2005/0113963 | A1 | 5/2005 | Cho et al. |

FOREIGN PATENT DOCUMENTS

| | | |
|---|---|---|
| DE | 198 08 565 | 9/1999 |
| EP | 0 879 675 | 11/1998 |
| EP | 1 296 210 | 3/2003 |
| JP | 5-324043 | 12/1993 |
| JP | 11-129144 | 5/1999 |
| JP | 11-254271 | 9/1999 |
| JP | 2006-263904 | 10/2006 |

OTHER PUBLICATIONS

International Search Report Issued Jan. 14, 2010 in PCT/FR09/051492 filed Jul. 24, 2009.
Office Action issued in Japanese Patent Application No. 2011-519224 on Jul. 23, 2013 with English translation.

*Primary Examiner* — Tejal Gami
(74) *Attorney, Agent, or Firm* — Oblon, Spivak, McClelland, Maier & Neustadt, L.L.P.

(57) ABSTRACT

A method of determining conditions for machining a part so as to avoid vibration appearing during the machining. A machining stage is simulated by provisionally setting parameters of a function for modulating cutting speed, by deducing a corresponding surface state, by modifying parameters iteratively with the machining stage being simulated each time until the surface state reaches an acceptable value, and by performing the machining stage by causing the cutting speed to vary in application of the corresponding modulation function.

4 Claims, 1 Drawing Sheet

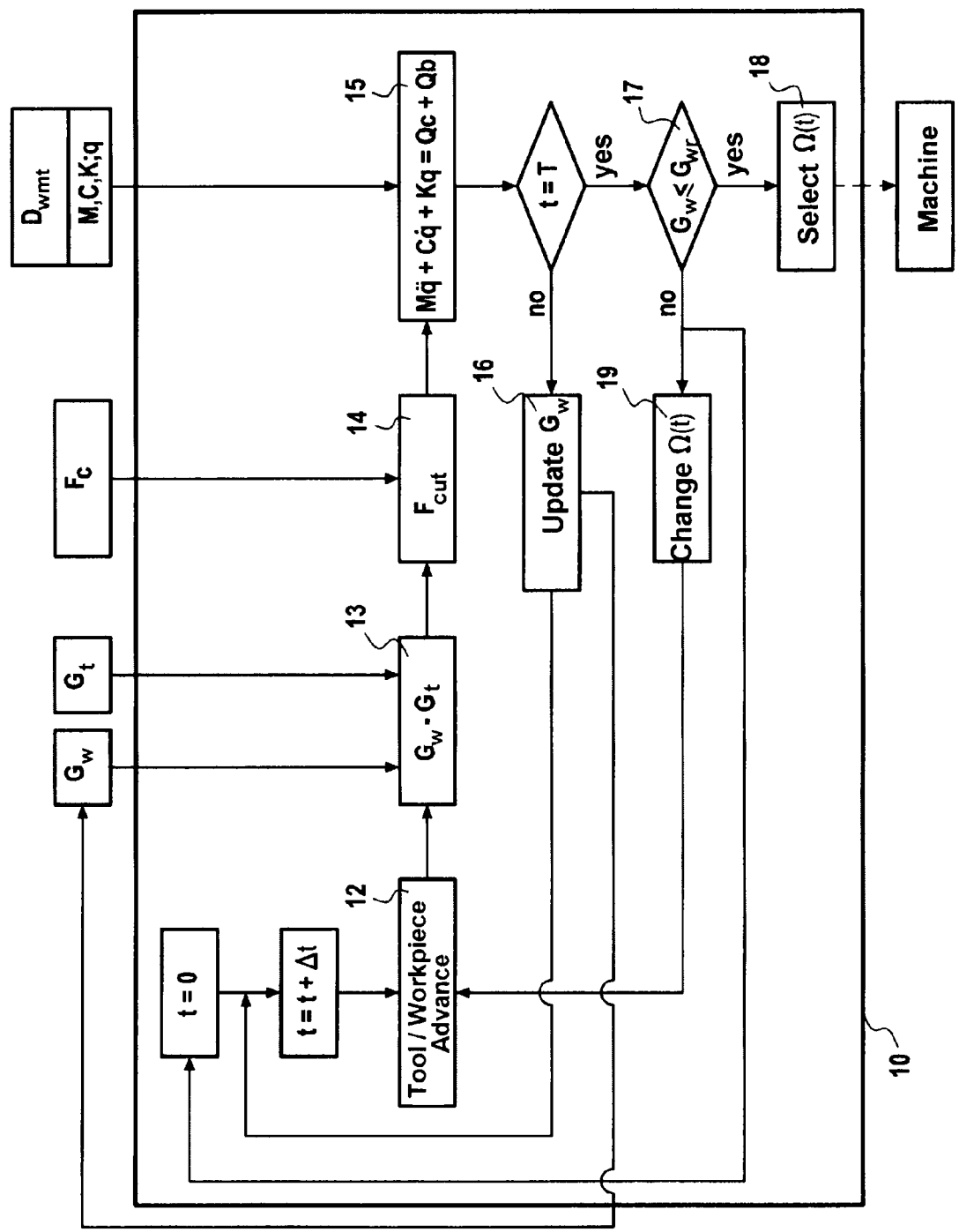

METHOD OF DETERMINING THE CONDITIONS OF A PHASE FOR MACHINING A WORKPIECE WITH MODULATED CUTTING RATE

The invention relates generally to determining the conditions for machining a workpiece that might enter into vibration during said machining. An object of the invention is to determine cutting conditions, and in particular cutting speed, so as to avoid such vibration appearing.

Certain large-dimensioned workpieces, e.g. such as the rotor disks of a turbomachine, present a bell-shape with a wall that is quite thin, and they tend to enter into vibration during machining.

Tools already exist for simulating vibration during machining, and in certain circumstances they make it possible to anticipate the occurance of vibration problems while turning or milling such parts. Nevertheless, those simulation tools are generally based on a frequency approach that is suitable only for studying systems in which the speed of rotation is constant. However, in order to avoid such a workpiece entering into resonance, it is advantageous to vary the speed of rotation (turning or milling speed) periodically so as to prevent the system from entering into resonance and thus prevent said vibration from appearing. Such a function for modulating cutting speed is characterized by two parameters: the amplitude of speed variation and the period of said variation.

Nevertheless, for each machining stage, it remains necessary to determine the appropriate modulation function. Until now, this has been done empirically. This means, when preparing the plan of procedure for machining each workpiece, that it is necessary to perform numerous tests, thereby giving rise to a significant loss of time and to numerous workpieces made of expensive alloy being discarded.

The invention enables this problem to be solved by proposing successive simulations of the machining stage so as to make it possible to optimize the parameters of the modulation function.

More particularly, the invention provides a method of determining conditions of a stage of machining a workpiece while modulating a cutting speed between the workpiece and a tool, the method being characterized by the following steps: simulating said machining stage by provisionally setting the parameters of a function for modulating said speed; deducing therefrom by calculation the corresponding surface state of the workpiece after said machining stage has been completed; iteratively modifying said parameters of the modulation function, each time simulating said machining stage so as to deduce therefrom the corresponding surface state until the surface state reaches an acceptable value; and performing said machining stage by causing the cutting speed to vary in application of the modulation function corresponding to the surface state of acceptable value.

The invention can be better understood and other characteristics thereof appear more clearly in the light of the following description of an example of the method of determining the conditions of a stage of machining a workpiece with modulation of the cutting speed between the workpiece and the tool, given purely by way of example and made with reference to the accompanying drawing in which the sole FIGURE is a block diagram with a flow chart for the iterative process of determining said parameters, enabling the machining to be controlled.

The FIGURE describes simulating machining. It is assumed that a machining pass is to be performed in a given time T. Let $\Delta T$ be a time interval in said given time T. The smaller the value selected for $\Delta T$, the greater the amount of calculation that needs to be performed, but that makes it possible to describe the phenomena and the shape of the part accurately, including its surface state at the end of the machining pass. This machining pass is a stage of machining during which the tool remains continuously engaged in the material of the workpiece.

Furthermore, various models are available for representing in computer form the workpieces and the assemblies that constitute the system and for describing the interactions between the various workpieces and assemblies with one another. Most models describing the mechanical behavior of workpieces and assemblies are prepared using the so-called "finite element" technique. The workpiece or the assembly is represented by a set of elements forming a mesh. Each node of the mesh is associated with values that represent the phenomena to be described. For example, for a simple representation of a workpiece that is assumed to be rigid, the coordinates of the nodes suffice for constituting the model. If the portion described by the model might vary (be deformed, moved), then additional degrees of freedom are needed for the transformations of the model. By way of example, three degrees of freedom are added in rotation and three degrees of freedom in translation.

The models describing the interactions between the various workpieces and the elements amongst one another may be of several kinds: transfer function, descriptive model, equation, . . . .

According to the invention, a distinction is drawn between the following models:

Gw is an initial geometrical model of the zone of the workpiece that is affected by the machining.

Gt is the geometrical model of the active portions of the tool. Gt may be constant, although it is possible to envisage and to describe slow variation in this model in order to take account of tool wear, for example. More precisely, this geometrical model is, in fact, a set of models describing the various individual tools (teeth, inserts, blades, . . . ). The geometrical model is a surface model. It represents the active portions of the tool, in particular its cutting faces.

If the active portions of the tool might deform, the geometrical model may incorporate the deformations of the active portions over time and as a function of the engagement between the tool and the workpiece.

Fc is a cutting force model (local cutting relationship) resulting from the interaction from the tool and the workpiece. By way of example, it is possible to use a cutting relationship of the Kienzle type that is known to the person skilled in the art and that serves to determine locally the instantaneous cutting forces as a function of the section of material being removed (thickness and width of cut, i.e. the dimensions of the swarf) and as a function of the tool-workpiece dynamics. The instantaneous cutting forces are the forces applied by the tool to the workpiece and by reaction to the points selected for describing accurately the interaction between the tool and the workpiece.

Dwmt is a dynamic model of the workpiece-machinetool system. This Dwmt model is typically a finite element model serving to describe the dynamic behavior of the system during machining. The dynamic model Dwmt incorporates parameters M, C, and K in the form of matrices and a column matrix q, as described below.

There follows a description of simulating machining, the description being given with reference to the FIGURE, in which the various models as defined above for intervening in the process are shown in the margin of the flow chart that illustrates the algorithm 10 for determining a function for modeling the cutting speed.

The instant t=0 is the beginning of a stage of simulating the intended machining. For each t=t+Δt it is possible to define the rate of advance of the tool relative to the workpiece (block 12). This rate of advance varies over time since it depends on the function for modulating the cutting speed. For example, the cutting speed may be expressed as follows:

$$\Omega(t)=\Omega_N+\Delta\Omega\cdot F\omega(t)$$

with $$-1<F\omega(t)<1$$

$F\omega(t)$ being a periodic function of period $2\Pi/\omega$, $\Omega_N$ being a nominal speed, and $\Delta\Omega$ being an amplitude of variation about said nominal speed.

Advantageously, $F\omega(t)$ is a sinewave.

A search is made for the parameters of this modulation function that enable a satisfactory surface state to be obtained, i.e. a "roughness" or an "undulation" that is less than a prescribed value.

Starting from this description 12 of the tool-to-workpiece rate of advance and from the models Gw and Gt, it is possible to describe (block 13) the interaction (intersection) between the workpiece and the tool. The result of this interaction and the model Fc serves to describe the local forces Fcut(t) (block 14).

Using the dynamic model Dwmt and the local forces Fcut (t), it is possible to write down and solve a system of differential equations (block 15)

$$M\ddot{q}+C\dot{q}+Kq=Q_c+Q_b$$

where:
  q(t) is the column matrix of a set of parameters $q_i(t)$;
  $\dot{q}(t)$ are the first derivatives of q(t);
  $\ddot{q}(t)$ are the second derivatives of q(t);
  $Q_c(t)$ represents the generalized forces resulting from interaction between the tool and the workpiece. They are derived from the local forces Fcut(t) obtained using the cutting model;
  $Q_b(t)$ represents generalized forces other than $Q_c$. It relates in particular to clamping forces;
  $M(t,\Omega)$ is the mass matrix;
  $C(t,\Omega)$ is the damping matrix; and
  $K(t,\Omega)$ is the stiffness matrix.

The matrices M, C, and K may vary (slowly) during machining to take account of losses of mass and stiffness as a result of material being removed. These matrices may also include a gyroscopic effect that is a function of $\Omega$.

For each predetermined time increment Δ(t) the system of differential equations is solved. Thus, knowing q(t) for t lying in the range [0,T], it is possible to obtain q(t+Δt), so long as the accumulated time intervals ΔT amount to less than T, i.e. so long as the intended machining stage has not terminated. At each increment, a material-removal algorithm 16 is implemented. The purpose of this material-removal algorithm is to simulate the removal of material on each time interval, i.e. to update the model Gw.

Once the entire machining stage has been simulated for a time (T), the state of Gw is compared with a reference Gwr (test 17), in particular in order to be in a position to evaluate the surface state of the workpiece at the end of the machining stage, typically one pass of the tool.

If the surface state of Gw is satisfactory, i.e. at least equal to that of Gwr, then the parameters of the modulation function that enable this result to be achieved are retained (block 18).

These parameters ΔΩ and ω are used subsequently to vary the speed of rotation (of the spindle when turning) in application of the modulation function during real machining of duration T.

If the surface state is not satisfactory, the parameters of the modulation function are changed (block 19) in order to modify the tool-workpiece advance characteristics and the simulation of the machining stage is restarted, with this taking place as often as necessary in order to obtain an updated model Gw that presents a satisfactory surface state.

It should be observed that algorithms implementing steps as described above have been published. The references of these publications are as follows:

Theses

Kaled Dekelbab, 1995, "Modélisation et simulation du comportement dynamique de l'ensemble Pièce-Outil-Machine en usinage par outil coupant" [Modeling and simulating the dynamic behavior of a workpiece-and-machinetool assembly during machining by a cutter tool], Ecole Nationale Supérieure d'Arts et Métiers—CER, Paris.

Erwan Beahchesne, 1999, "Modélisation et simulation dynamique de l'usinage: prise en compte d'une pièce déformable" [Dynamic simulation and modeling of machining: taking account of a workpiece that is deformable], Ecole Nationale Supérieure d'Arts et Métiers—CER, Paris.

Audry Marty, 2003, "Simulation numérique de l'usinage par outil coupant à l'échelle macroscopique: contribution à la définition géométrique de la surface usinée", [Numerical simulation of machining by a cutting tool at a macroscopic scale: contribution to a geometrical definition of the machined surface], Ecole Nationale Supérieure d'Arts et Métiers—CER, Paris.

Stéphanie Cohen-Assouline, 2005, "Simulation numérique de l'usinage à l'échelle macroscopique: prise en compte d'une pièce déformable" [Numerical simulation of machining at macroscopic scale: taking account of a workpiece that is deformable], Ecole Nationale Supérieure d'Arts et Métiers—CER, Paris.

Articles Published in Journals

S. Assouline, E. Beauchesne, G. Coffignal, P. Lorong and A. Marty, 2002, "Simulation numérique de l'usinage à l'échelle macroscopique: modèles dynamiques de la pièce" [Numerical simulation of machining at macroscopic scale: dynamic models of the workpiece], Mécanique et Industrie, Vol. 3, pp. 389-402.

P. Lorong, J. Yvonnet, G. Coffignal and S. Cohen, 2006, "Contribution of Computational Mechanics in Numerical Simulation of Machining and Blanking", Archives of Computational Method in Engineering, Vol. 13, pp. 45-90.

A presently preferred algorithm is being used in software known under the name Nessy. Nessy has been described more particularly in the following articles:

P. Lorong, F. Ali and G. Coffignal, 2000, "Research oriented software development platform for structural mechanics: a solution for distributed computing", Second International Conference on Engineering Computational Technology, Developments in engineering computational technology, ed. B. H. V. Topping Louvain, Belgium, pp. 93-100.

G. Coffignal and P. Lorong, 2003, "Un Logiciel éléments finis pour développer et capitaliser des travaux de recherche" [Finite element software for developing and capitalizing research work], $6^{ème}$ Colloque National en Calcul des Structures, Giens.

The method of the invention is more particularly useful for turning large-diameter workpieces such as turbine or compressor rotor disks for a turbojet. Such workpieces are likely to enter into vibration during machining under the effect of the cutting force. Prior determination of an optimum modulation function for the relative speed of rotation between the workpiece and the tool throughout the machining stage serves to prevent such vibratory modes appearing, and thus to obtain the desired surface state.

The invention claimed is:

1. A method of determining conditions of a stage of machining a workpiece while modulating a cutting speed between the workpiece and a tool, the method comprising:
   simulating the machining stage by provisionally setting parameters of a modulation function for modulating the cutting speed;
   deducing therefrom by calculation a corresponding surface state of the workpiece after the machining stage has been completed;
   iteratively modifying the parameters of the modulation function, each time simulating the machining stage so as to deduce therefrom the corresponding surface state until the surface state reaches an acceptable value; and
   performing the machining stage by causing the cutting speed to vary in application of the modulation function corresponding to the surface state of acceptable value,
   wherein the modulation function of a cutting speed $\Omega(t)$ is of type:

$$\Omega(t) = \Omega_N + \Delta\Omega \cdot F\omega(t)$$

with $$-1 < F\omega(t) < 1$$

$F\omega(t)$ being a periodic function of period $2\Pi/\omega$, $\Omega_N$ being a nominal speed, and $\Delta\Omega$ being an amplitude of variation about the nominal speed.

2. A method according to claim 1, wherein the periodic function is a sinewave.

3. A method according to claim 1, wherein the machining is a turning operation.

4. A method according to claim 2, wherein the machining is a turning operation.

* * * * *